US009003187B2

(12) United States Patent
Girao et al.

(10) Patent No.: US 9,003,187 B2
(45) Date of Patent: Apr. 7, 2015

(54) METHOD FOR SUPPORTING A REPUTATION MECHANISM IN A NETWORK AND NETWORK

(75) Inventors: Joao Girao, Ludwigshafen (DE); Felix Gomez Marmol, Murcia (ES)

(73) Assignee: NEC Europe Ltd., Heidelberg (DE)

( * ) Notice: Subject to any disclaimer, the term of this patent is extended or adjusted under 35 U.S.C. 154(b) by 69 days.

(21) Appl. No.: 13/505,030

(22) PCT Filed: Oct. 29, 2010

(86) PCT No.: PCT/EP2010/006612
§ 371 (c)(1),
(2), (4) Date: Jun. 7, 2012

(87) PCT Pub. No.: WO2011/050967
PCT Pub. Date: May 5, 2011

(65) Prior Publication Data
US 2012/0260092 A1    Oct. 11, 2012

(30) Foreign Application Priority Data

Oct. 29, 2009    (EP) .................................... 09013609

(51) Int. Cl.
*H04L 29/06*    (2006.01)
*G06Q 50/18*    (2012.01)

(52) U.S. Cl.
CPC ............ *H04L 63/105* (2013.01); *G06Q 50/188* (2013.01)

(58) Field of Classification Search
CPC ................................ H04L 9/30; G06Q 50/188
USPC .......................................................... 713/168
See application file for complete search history.

(56) References Cited

U.S. PATENT DOCUMENTS 6,850,923 B1 *    2/2005    Nakisa et al. .................... 706/47
7,006,999 B1 *    2/2006    Huberman et al. ............. 705/74
(Continued)

FOREIGN PATENT DOCUMENTS

EP           1698993 A2     9/2006
JP        2005295543 A    10/2005
(Continued)

OTHER PUBLICATIONS

International Search Report dated Apr. 8, 2011, corresponding to PCT/EP2010/006612.
(Continued)

*Primary Examiner* — Harunur Rashid
*Assistant Examiner* — Bryan Wright
(74) *Attorney, Agent, or Firm* — Young & Thompson

(57) ABSTRACT

Method for supporting a reputation mechanism in a network including one or more domains with one or more users being connected to the domains, one or more Identity Providers that manage identity information, and at least one entity that functions as Web Service Consumer for the users. When a user requests a Web Service Consumer of one of the domains for a web service provided by a Web Service Provider, the requested Web Service Consumer requests its known Identity Providers regarding a recommendation of the Web Service Provider. The Identity Providers function as recommendation aggregators by collecting reputation assessments of the Web Service Provider from entities registered on the Identity Providers who return an aggregated recommendation to the requested Web Service Consumer that determines a trust assessment about the Web Service Provider. A privacy homomorphism is employed for providing an encrypted exchange of recommendation related information.

21 Claims, 9 Drawing Sheets

(56) References Cited

U.S. PATENT DOCUMENTS

| | | | |
|---|---|---|---|
| 7,831,522 B1* | 11/2010 | Satish et al. | 705/76 |
| 2002/0133365 A1* | 9/2002 | Grey et al. | 705/1 |
| 2004/0088348 A1 | 5/2004 | Yeager et al. | |
| 2004/0243816 A1* | 12/2004 | Hacigumus et al. | 713/193 |
| 2005/0220306 A1 | 10/2005 | Westhoff et al. | |
| 2006/0020783 A1* | 1/2006 | Fisher | 713/156 |
| 2007/0208940 A1* | 9/2007 | Adelman et al. | 713/168 |
| 2007/0220146 A1 | 9/2007 | Suzuki | |
| 2008/0175226 A1 | 7/2008 | Alperovitch et al. | |
| 2009/0204542 A1* | 8/2009 | Doman et al. | 705/50 |
| 2010/0010824 A1* | 1/2010 | Kim et al. | 705/1 |
| 2010/0229235 A1* | 9/2010 | Dawson et al. | 726/22 |

FOREIGN PATENT DOCUMENTS

| | | |
|---|---|---|
| JP | 2006244473 A | 9/2006 |
| JP | 2007249413 A | 9/2007 |
| JP | 2008538247 A | 10/2008 |
| WO | 2006103176 A1 | 10/2006 |

OTHER PUBLICATIONS

Elgamal; A Public Key Cryptosystem and a Signature Scheme Based on Discrete Logarithms; vol. 31. No. 4; Jul. 1, 1985; pp. 469-472.

Josang et al., "A Survey of Trust and Reputation Systems for Online Service Provision", Decision Support Systems, 2007, vol. 43, No. 2, pp. 618-644.

Sabater et al., "Review on computational trust and reputation models", SabaterSierra.tex, 2003, pp. 1-28.

Douceur et al., "The Sybil Attack", Microsoft Research, 2002, pp. 1-6.

Girao et al., "Virtual Identities—A Cross Layer approach to Identity and Identity Management", Wireless World Research Forum, Nov. 2006, pp. 1-7.

Marmol et al., "Providing trust in wireless sensor networks using a bio-inspired technique", Telecommun Syst, 2011, vol. 46, pp. 163-180.

Kamvar et al., "The Eigen Trust Algorithm for Reputation Management in P2P Networks", WWW 2003.

Marti et al., "Identity Crisis: Anonymity vs. Reputation in P2P Systems", Stanford University, 2003.

Marti et al., "Taxonomy of Trust: Categorizing P2P Reputation Systems", Stanford University, 2005, pp. 1-20.

Mykletun et al., "Public Key Based Cryptoschemes for Data Concealment in Wireless Sensor Networks", 2006.

Sabater et al., "Regret: Reputation in gregarious societies", AGENTS'01, 2001.

Sabater et al., "Social ReGreT, a reputation model based on social relations", 2002, pp. 44-56.

Xiong et al., "PeerTrust: Supporting Reputation-Based Trust for Peer-to-Peer Electronic Communities", 2004, pp. 1-35.

Yu et al., "An Improved Global Trust Value Computing Method in P2P Systems", ATC 2006, LNCS 4158, pp. 258-267.

Zhang et al., "A Social Network-Based Trust Model for the Semantic Web", ATC 2006, LNCS 4158, pp. 183-192.

* cited by examiner

METHOD FOR SUPPORTING A REPUTATION MECHANISM IN A NETWORK AND NETWORK

BACKGROUND OF THE INVENTION

1. Field of the Invention

The present invention relates to a method for supporting a reputation mechanism in a network, wherein said network includes one or more domains with one or more users being connected to said domains, one or more Identity Providers that manage identity information on behalf of said users, and at least one entity that functions as Web Service Consumer for said users.

Furthermore, the invention relates to a network including a reputation mechanism, said network comprises one or more domains with one or more users being connected to said domains, one or more Identity Providers that manage identity information on behalf of said users, and at least one entity that functions as Web Service Consumer for said users.

2. Description of the Related Art

In the field of the internet and the World Wide Web, electronic transactions are becoming everyday more and more important. Many daily tasks like going shopping, watching the news or calling friends can be performed by means of electronic transactions. But even more tedious ones like booking a flight or a hotel room, or enrolling at the university, among many others, have been simplified by using the internet.

However, as many more applications appear and become popular, also many security risks threaten its safe working. Due to their impersonal nature, electronic transactions suffer from several security deficiencies that have not been accurately solved yet and are, therefore, slowing down the extensive use of these very useful technologies by the society.

Service Providers from the same domain and even from different domains have to deal with these problems everyday. It is an enormous problem that an entity, in the following mentioned as Web Service Consumer (WSC) has when, in order to provide a requested service to a certain user, the Web Service Consumer needs to previously exchange some information with another entity, in the following mentioned as Web Service Provider (WSP). Currently, many domains carry out such a transaction in a secure way by means of a Service Level Agreement (SLA), as well as by the use of Authentication, Authorization and Accounting (AAA) frameworks. However, the problem is that a Service Level Agreement is not always available between every pair of domains. Moreover, the Service Level Agreement is not always easy to achieve and frequently has associated costs. Thus, many times no such agreement is in place to ensure the validity of the information provided by the other domain.

BRIEF SUMMARY OF THE INVENTION

It is therefore an object of the present invention to improve and further develop a method and a network of the initially described type in such a way that, by employing mechanisms that are readily to implement, a Web Service Consumer of a domain is enabled to determine in an efficient way whether information provided by a Web Service Provider of another domain can be taken as reliable or not.

In accordance with the invention, the aforementioned object is accomplished by a method. Such a method is characterized in that, in case a user requests a Web Service Consumer of one of said domains for a web service provided by a Web Service Provider, in particular of another of said domains, said requested Web Service Consumer requests its known Identity Providers regarding a recommendation of said Web Service Provider, wherein said Identity Providers function as recommendation aggregators by collecting reputation assessments of said Web Service Provider from entities being registered on said Identity Providers, in particular users and/or Web Service Consumers, wherein said Identity Providers return an aggregated recommendation to said requested Web Service Consumer that, on the basis of said aggregated recommendation, determines a trust assessment about said Web Service Provider, and wherein a privacy homomorphism is employed for providing an encrypted exchange of recommendation related information between said Identity Providers and said requested Web Service Consumer.

Furthermore, the aforementioned object is accomplished by a network characterized in that, in case a user requests a Web Service Consumer of one of said domains for a web service provided by a Web Service Provider, in particular of another of said domains, said requested Web Service Consumer requests its known Identity Providers regarding a recommendation of said Web Service Provider, wherein said Identity Providers function as recommendation aggregators by collecting reputation assessments of said Web Service Provider from entities being registered on said Identity Providers, in particular users and/or Web Service Consumers, wherein said Identity Providers return an aggregated recommendation to said requested Web Service Consumer that, on the basis of said aggregated recommendation, determines a trust assessment about said Web Service Provider, and wherein a privacy homomorphism is employed for providing an encrypted exchange of recommendation related information between said Identity Providers and said requested Web Service Consumer.

According to the invention it has first been recognized that the need of a service level agreement between a pair of domains for enabling entities of one domain to securely access data or systems of another domain seamlessly can be overcome by employing a reputation mechanism. Specifically, it has been recognized that a reputation mechanism can be employed in such an advantageous way that the trustworthiness of a service provider can be determined. According to the invention in case a user requests a Web Service Consumer of one of the domains for a web service provided by a Web Service Provider, in particular of another of the domains, the requested Web Service Consumer requests all its known Identity Providers regarding a recommendation of the Web Service Provider. A web service provided by a Web Service Provider in this context can already mean that the Web Service Consumer needs to retrieve and exchange some information with the Web Service Provider in order to provide or deliver the corresponding web service to the requesting user. Further, each of the Identity Providers functions as recommendation aggregator by collecting reputation assessments of the Web Service Provider from entities being registered on the Identity Provider, in particular users and/or Web Service Consumers. This means that the Identity Providers collect the opinions of the entities being registered on them. Moreover, each of the Identity Providers returns an aggregated recommendation to the requested Web Service Consumer that, on the basis of the aggregated recommendation, determines a trust assessment about the Web Service Provider.

Consequently, the Web Service Consumer can decide by means of the trust assessment whether the information received in the context of the web service from the Web Service Provider is reliable or not. With respect to safety and security, a privacy homomorphism is employed for providing an encrypted exchange of recommendation related information between the Identity Providers and the requested Web Service Consumer. The use of the privacy homomorphism allows the aggregation of some sensitive information within the reputation mechanism in a privacy preserving way without revealing the information.

Thus, the method or the network according to the invention can advise a domain when it has to decide whether to exchange some necessary information with another domain or not, depending on the trustworthiness and reputation of the other domain.

According to a preferred embodiment the aggregated recommendation returned by the Identity Providers to the requested Web Service Consumer may be a single aggregated value for recommendations of the users being registered on the Identity Providers. Equally, the aggregated recommendation may be a single aggregated value for recommendations of the Web Service Consumers being registered on the Identity Providers. Furthermore, the aggregated recommendation may be a single aggregated value for recommendations of the users and the Web Service Consumers that are registered on the Identity Providers.

According to a preferred embodiment the ElGamal encryption scheme may be applied as privacy homomorphism. The encryption scheme according to ElGamal as described in Taher ElGamal, "A public key cryptosystem and a signature scheme based on discrete logarithms", Springer-Verlag, 1998, is a multiplicative privacy homomorphism. This encryption scheme may be adapted to elliptic curve (EC) mapping the homomorphism in an additive group. As in most elliptic curve based schemes, the security of the scheme will depend on the choice of the elliptic curve E, prime p and the choice of generator G. The elliptic curve E should be chosen in such a way that the Elliptic Curve Discrete Log Problem (ECDLP) is verified.

EC-EG offers the properties that are required, e.g. a low bandwidth cost, flexibility and efficient operations. For example, in case it is chosen p to be a 163-bit number, then the ciphered text will take up 2*(163+1) bits. The scheme is versatile and flexible. Moreover, the cost of addition and multiplication with a scalar are a point addition and two point multiplications with small numbers that is respectable. A point addition is considered a cheap operation in EC and the complexity of the point multiplication depends on the size of the operands. These reasons make the following scheme the perfect candidate to apply for the method according to the invention:

| ElGamal Encryption Scheme (EC-EG) | |
|---|---|
| Public Key | $E, p, G, Y = xG$, where $G, Y \in F_p$ |
| Private Key | $x \in F_p$ |
| Encryption | plaintext $M = map(m)$, |
| | $r \in_R F_p$, |
| | ciphertext $C = (R, S)$, where |
| | $R = kG, S = M + kY$ |
| Decryption | $M = -xR + S = -xkG + M + xkG$, |
| | $m = rmap(M)$ |
| EC-EG Homomorphic Properties | |
| Addition | $(R_1, S_1) + (R_2, S_2) =$ |
| | $(k_1G + k_2G, M_1 + M_2 + k_1Y + k_2Y)$ |
| | $((k_1 + k_2)G, (M_1 + M_2) + (k_1 + k_2)Y)$ |
| Scalar Multiplication | $\alpha * (R, S) =$ |
| | $(\alpha * kG, \alpha * (M + kY))$ |

| map(x) Function Properties | |
|---|---|
| Addition | $map(m_1) + map(m_2) = m_1G + m_2G =$ |
| | $(m_1 + m_2)G = map(m_1 + m_2)$ |
| Scalar Multiplication | $\alpha * map(m) =$ |
| | $\alpha * mG = map(\alpha * m)$ |

Since EC-EG functions in terms of points in the EC, a function map(x) and its reverse function rmap(x) may be required. These functions should map an integer number to a point in the curve, and vice versa, such that the privacy homomorphism properties are maintained throughout all operations on encrypted text. Although there are standard mechanisms to translate an integer into a point in the curve, due to the restriction explained above, it may be opted for a mechanism introduced in Mykletun, Girao and Westhoff, "Public key based cryptoschemes for data concealment in wireless sensor networks", in IEEE International Conference on Communications, Istanbul, Turkey, June 2006, which defines map (x)=xG and rmap(x) as the brute force of the ECDLP. Since in the context of the invention it is intended to work with relatively small numbers, in particular less than 32 bits, this restriction is acceptable. Thus, by using this cryptographic tool, a purely private system can be achieved, wherein storage points and intermediaries, in particular Identity Providers, do not have direct access to sensitive data.

With regard to the encryption of sensitive information, it may be provided that in a very first step, the requested Web Service Consumer sends its public key to the Identity Providers, together with a default initial weight for all the entities being registered on the Identity Providers, and wherein the initial weight is encrypted with the public key of the requested Web Service Consumer.

Advantageously, it may be provided that each of the Identity Providers stores a weight given by the requested Web Service Consumer to each of the entities being registered on the Identity Providers, and wherein the weight is encrypted with a public key of the requested Web Service Consumer. Thus, the Identity Providers cannot discover the actual weight of an entity.

In a further step, the requested Web Service Consumer may decrypt the aggregated recommendation returned by the Identity Providers with its private key to obtain a weighted recommendation of the entities being registered on the Identity Providers.

According to a preferred embodiment each of the Identity Providers may perform the aggregated recommendation of users being registered on the Identity Providers according to $$\sum_{i=0}^{n} \varphi(\omega_{u_i}) \cdot Rec_{u_i} = \varphi\left(\sum_{i=1}^{n} \omega_{u_i} \cdot Rec_{u_i}\right), \qquad (1)$$

wherein $Rec_{U_i}$ is a recommendation provided by a user $U_i$ being one of n users that are registered on the corresponding Identity Provider, wherein $\omega_{u_i}$ is the weight assigned to the recommendation of the user $U_i$, and wherein $\varphi$ is a privacy homomorphism that allows addition and scalar multiplication. Thus, the requested Web Service Consumer can weight the recommendation of each user individually, using few messages and the actual recommendation or recommendation value of each user is only known by its corresponding Identity Provider.

Furthermore, the Identity Providers may perform the aggregated recommendation of Web Service Consumers being registered on the Identity Providers according to $$\sum_{i=0}^{m} \varphi(\omega_{WSC_i}) \cdot Rec_{WSC_i} = \varphi\left(\sum_{i=1}^{m} \omega_{WSC_i} \cdot Rec_{WSC_i}\right), \quad (2)$$

wherein $Rec_{WSC_i}$ is a recommendation provided by a Web Service Consumer $WSC_i$ being one of m Web Service Consumers that are registered on the corresponding Identity Provider, wherein $\omega_{WSC_i}$ is the weight assigned to the recommendation of the Web Service Consumer $WSC_i$, and wherein $\phi$ is a privacy homomorphism that provides addition and scalar multiplication.

Once, in case the recommendations of the Web Service Provider has been collected from the entities being registered on the Identity Providers, a trust assessment in the form of a global trust value may be given to the Web Service Provider, by aggregating the collected recommendations. The trust of the users regarding the Web Service Provider, for example $T_U \in [0,1]$, may be computed by a weighted sum of the recommendations of each user $U_i$ and for example $Rec_{U_i} \in [0,1]$, according to $$T_U = \sum_{i=1}^{n} \omega_{u_i} \cdot Rec_{u_i},$$

wherein $\omega_{U_i}$, e.g. $\omega_{U_i} \in [0,1]$, is the weight given by the requested Web Service Consumer to user $u_i$.

Equally, the trust of the Web Service Consumers regarding the Web Service Provider, may be computed according to $$T_{WSC} = \sum_{i=1}^{m} \omega_{WSC_i} \cdot Rec_{WSC_i}.$$

With regard to the assessment of the Web Service Provider, the trust assessment may be determined according to $$GT = (\omega_D \cdot T_D) + (\omega_U \cdot T_U) + (\omega_{WSC} \cdot T_{WSC}), \quad (3)$$

wherein GT is the trust assessment in the form of a global trust value assigned to the Web Service Provider, wherein $T_D$ is a direct trust, i.e. direct experiences, placed on the Web Service Provider, wherein $T_U$ is the aggregated trust received from other users, wherein $T_{WSC}$ is the aggregated trust received from other Web Service Consumers, and wherein $\omega_D$, $\omega_U$ and $\omega_{WSC}$ are the corresponding weights with e.g. $\omega_D$, $\omega_U$, $\omega_{WSC} \in [0,1]$. If the requested Web Service Consumer has no past experiences with the Web Service Provider, then $T_D$ may take an initial value of 0.5, otherwise $T_D$ may take the last computed trust assessment, i.e. $T_D$=GT.

Advantageously, it may be provided that the first time a transaction is to be carried out between the requested Web Service Consumer and the Web Service Provider formula (3) is applied. However, for the $n_{th}$ transaction it may be provided that the trust assessment GT of the Web Service Provider may be computed according to $$GT^{(n)} = \omega_D^n \cdot T_D + (\omega_U \cdot T_U + \omega_{WSC} \cdot T_{WSC}) \cdot \sum_{i=0}^{n-1} \omega_D^i$$

that is equal to $$GT^{(n)} = \omega_D^n \cdot T_D + (\omega_U \cdot T_U + \omega_{WSC} \cdot T_{WSC}) \cdot \frac{1 - \omega_D^n}{1 - \omega_D}$$

In doing so, it is noted that it should be applied $$\sum_{i=1}^{n} \omega_{u_i} = \sum_{i=1}^{m} \omega_{WSC_i} = \omega_D + \omega_U + \omega_{WSC} = 1 \quad (4)$$

Therefore if, for instance, $\omega_D=1$ then $GT^{(n)}=T_D$, i.e. only the direct trust is taken into consideration, and if $\omega_D=0$ then $GT^{(n)}=\omega_U \cdot T_U + \omega_{WSC} \cdot T_{WSC}$, which means that only the trust of users and Web Service Consumers is accepted.

The requested Web Service Consumer may define trust levels, wherein the requested Web Service Consumer fits the trust assessment of the Web Service Provider in one of the trust levels. Advantageously, it may be provided that fuzzy sets are employed in order to represent the trust levels.

According to a preferred embodiment the requested Web Service Consumer may request the web service to the Web Service Provider, wherein the requested Web Service Provider provides more or less parameters depending on which trust level the Web Service Provider is placed. Thus, after computing the trust assessment, the requested Web Service Consumer may have to decide whether to carry out the whole transaction with the Web Service Provider, to carry it out partially or even not to have any interaction with the Web Service Provider. This decision may depend on which trust level the Web Service Provider is placed. In doing so, the requested Web Service Consumer may define its own trust levels.

According to a preferred embodiment rewards and/or punishments may be performed on the users and/or on the Web Service Consumers being registered on the Identity Providers according to accuracy and reliability of their recommendations.

Advantageously, it may be provided that the requesting user gives a feedback to the requested Web Service Consumer, wherein the feedback includes the satisfaction of the requesting user with the provided web service.

According to a preferred embodiment the requested Web Service Consumer may send the satisfaction together with a threshold δ to the Identity Providers, wherein the threshold δ is employed to determine whether to punish or reward the users and/or the Web Service Providers being registered on the Identity Providers. Both the satisfaction and the threshold need not be ciphered.

Advantageously, the divergence between the satisfaction Sat of the requesting user and a previously given recommendation $Rec_{U_i}$ of a user $U_i$ may be measured by calculating the value of $|Sat-Rec_{U_i}|$, wherein a reward is performed on user $U_i$ in case of $|Sat-Rec_{U_i}|<\delta$, and wherein a punishment is performed on user $U_i$ in case of $|Sat-Rec_{U_i}|\geq\delta$.

Furthermore, in case a reward is to be performed on user $U_i$, the weight of user $U_i$ may be increased according to $$\phi(\omega_{U_i})^{|Sat-Rec_{U_i}|} = \phi(\omega_{U_i}^{|Sat-Rec_{U_i}|}), \text{ and} \quad (5)$$

wherein in case a punishment is to be performed on user $U_i$, the weight $\omega_{U_i}$ of user $U_i$ may be decreased according to $$\varphi(w_{u_i})^{\frac{1}{|Sat-Rec_{u_i}|}} = \varphi\left(\omega_{u_i}^{\frac{1}{|Sat-Rec_{u_i}|}}\right). \quad (6)$$

In case a reward is to be performed on Web Service Consumer $WSC_i$, the weight $\omega_{WSC_i}$ of user $WSC_i$ may be increased according to $$\phi(\omega_{WSC_i})^{|Sat-RecWSCi|} = \phi(\omega_{WSC_i}^{|Sat-RecWSCi|}), \text{ and} \quad (7)$$

wherein in case a punishment is to be performed on user $U_i$, the weight of user $U_i$ may be decreased according to $$\varphi(\omega_{WSC_i})^{\frac{1}{|Sat-Rec_{WSC_i}|}} = \varphi\left(\omega_{WSC_i}^{\frac{1}{|Sat-Rec_{WSC_i}|}}\right). \quad (8)$$

According to a preferred embodiment, each of the Identity Providers may calculate an average deviation of the satisfaction of the requesting user with the recommendations of the users and/or the Web Service Consumers being registered on the Identity Providers, wherein the Identity Providers sends the average deviation to the requested Web Service Consumer.

Advantageously, the requested Web Service Consumer may perform a corresponding reward or punishment on the weights $\omega_U$ and $\omega_{WSC}$ on the basis of the average deviation received from the Identity Providers.

BRIEF DESCRIPTION OF THE DRAWINGS

There are several ways how to design and further develop the teaching of the present invention in an advantageous way. To this end it is to be referred to the patent claims and to the following explanation of preferred embodiments of the invention by way of example, illustrated by the drawing. In connection with the explanation of the preferred embodiments of the invention by the aid of the drawing, generally preferred embodiments and further developments of the teaching will we explained. In the drawing

DETAILED DESCRIPTION OF THE PREFERRED EMBODIMENTS

Figure 1:
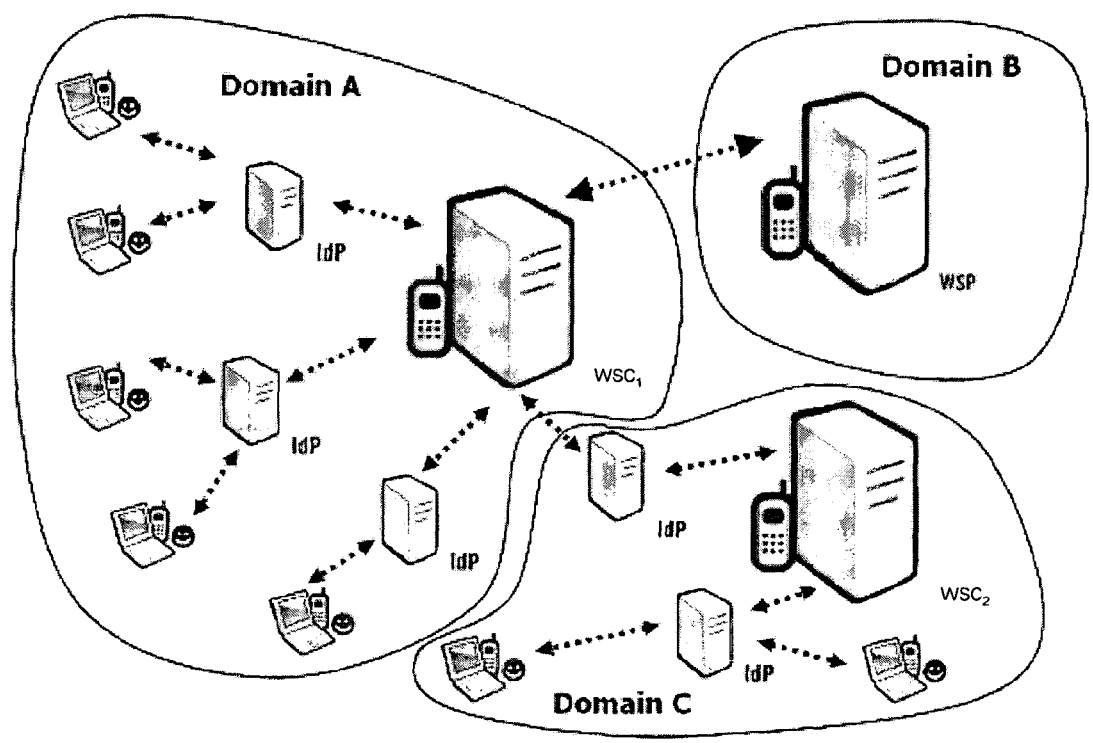
FIG. 1 illustrates an application scenario of the method and the network according to the present invention.

FIG. 1 shows an application scenario of the method and the network according to the invention and clarifies the problem that is solved. According to FIG. 1, there are several (mobile) users connected to different domains at a certain moment. Some of the entities belonging to these domains act as Web Service Provider WSP or Web Service Consumer WSC for the users who are currently connected to them. But in order to actually provide services to the users, a Web Service Consumer needs to retrieve and exchange some information with another Web Service Provider.

This information exchange between two domains is usually done under a well known and accepted Service Level Agreement (SLA). By means of a SLA, every domain can be sure that the information provided by the other domain is trustworthy.

However, it is not always possible to find a SLA between every pair of domains. Therefore, there is need of a mechanism to allow a domain to somehow determine if the information provided by another, maybe unknown, domain can be taken as reliable or not. The mechanism that is applied is a reputation and trust model. The Identity Providers (IdPs) manage identity information on behalf of users and provide assertions of users' authentication to other Providers. The Identity Providers act as recommendation aggregators, i.e. the Identity Providers collect the opinions of the users belonging to each Identity Provider IdP and return a single aggregated value.

According to the application scenario of FIG. 1, a user asks for a certain service to the Web Service Consumer $WSC_1$ of domain A. Then, $WSC_1$ needs to exchange some information with Web Servicer Provider WSP of domain B in order to carry out the delivery of the requested service to the asking user. Therefore, first of all, $WSC_1$ checks if it has had past experiences, i.e. transactions, with WSP, and whether these past experiences were satisfactory or not.

Once this revision has been done, $WSC_1$ asks other users, regardless the domain they are connected to, that have had past experiences with WSP about its behaviour. And finally, $WSC_1$ also asks other WSCs who have had past interactions with WSP, as well, about their satisfaction with the performed interaction. In doing so, every user and every WSC has to record its satisfaction with every transaction (or at least the last n ones) carried out with every WSP belonging to another domain.

As soon as $WSC_1$ has collected all that information, $WSC_1$ assesses how trustworthy or reputable WSP is, according to some self-defined trust levels. That means that every domain can determine its own trust levels depending on its needs and on how confident or unconfident it is. Thus, according to the trust level where $WSC_1$ placed WSP, the information exchange will be totally or partially done, or even not carried out.

Supposing that $WSC_1$ trusts in WSP enough to let the information exchange to happen, the service is then provided to the user who requested it. This user also informs $WSC_1$ about its satisfaction with that specific received service. This feedback information can help $WSC_1$ to increase or decrease its trust in the Web Service Provider, according to its self-defined trust levels, and also to punish or reward the recommendations given in the previous step. Nevertheless, even more important than if $WSC_1$ trusts in exchanged information of the Web Service Provider may be that if the Web Service Provider trusts in $WSC_1$ as the legitimate receiver of that information, because if the latter does not occur, the information is not be given to $WSC_1$, and the service is not be delivered.

But if $WSC_1$ does not trust in WSP's information, the information exchange can be performed anyway, if the user authorizes it. Equally, if $WSC_i$ trusts in WSP, but the user does not trust at all in WSP, the service will not be delivered. So the user's opinion about WSP will be decisive when computing the trust level from the point of view of $WSC_1$.

Figure 2:
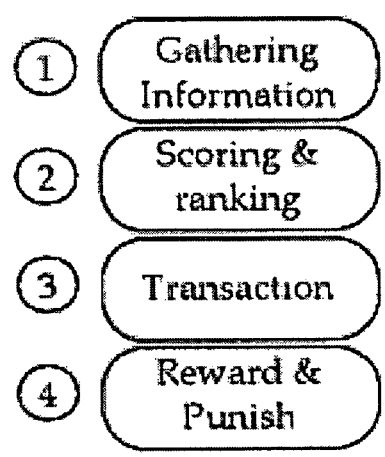
FIG. 2 illustrates the main steps of a trust and reputation model describing a method according to the present invention.

FIG. 2 illustrates the main steps of a trust and reputation model that describes a method according to the invention. In particular, FIG. 2 shows the main generic steps that every reputation model may follow for an environment like the one illustrated in FIG. 1.

The first step of FIG. 2 consists of collecting as much information as possible about the behaviour of the entity that is being evaluated, in particular a Web Service Provider. This information can come from direct past experiences, acquaintances' experiences, pre-trusted entities, etc. In the application scenario of FIG. 1 the sources of information of a domain will be its direct past experiences and the past experiences of other users and other domains with the targeting domain, in particular the targeting Web Service Provider. However, not every source of information should have the same weight or the same reliability. And for a certain source of information, not everybody should have the same reliability, neither.

In the second step of FIG. 2, the trust and reputation model should aggregate all the information obtained in the previous step in order to get a rating or scoring value for the Web Service Provider. Once this value has been computed, the evaluated domain will be fit in some of the trust levels of the evaluator domain. These levels, self-defined by every domain, can vary from not trusting at all, to absolutely trust which could be equivalent to having a SLA.

In the third step of FIG. 2, according to which trust level the evaluated domain has been placed, the information exchange is totally or partially carried out or even not done. Once the evaluating domain has received the information from the evaluated domain supposing the latter was considered enough trustworthy, the service can be actually provided to the user who requested it.

After receiving the service, the user sends back his/her satisfaction with that certain service to the domain that provided it, namely to the Web Service Consumer. In the last step of FIG. 2, this domain uses the feedback information in order to modify the trust score given to the domain which exchanged the information necessary to deliver the service, increasing or decreasing it. The weights of the recommendations sources, i.e. users and Web Service Consumers are also adjusted.

FIG. 3 shows three different approaches of gathering information in order to provide a trust assessment of the Web Service Provider. Generally, there are three information sources that are considered: the own Web Service Consumer that is evaluating the Web Service Provider, the users that have had past experiences with that Web Service Provider and other Web Service Consumers that have also had previous transactions with the Web Service Provider. So when the requested Web Service Consumer $WSC_1$ computes its trust in the Web Service Provider, $WSC_1$ checks if it has had any interaction with the Web Service Provider in the past. If so, the last computed global trust value for the Web Service Provider is taken now as the direct trust $T_D$. On the other hand, there are the trust $T_U$ that other users deposit on the Web Service Provider, and the trust $T_{WSC}$ of other Web Service Consumers in that certain Web Service Provider. The problem here is how $WSC_1$ can find out which users and other Web Service Consumers have had any interaction with the Web Service Provider.

Figure 3A:
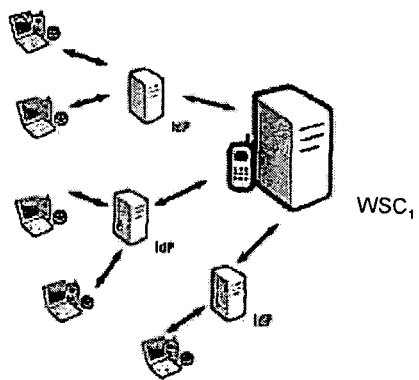
FIG. 3 shows with FIG. 3a, FIG. 3b and FIG. 3c three different approaches of gathering information in order to provide a trust assessment of the Web Service Provider according to the present invention.

FIG. 3a shows the first approach, wherein $WSC_1$ asks all the users through their corresponding Identity Provider IdP if they have had any transaction with the Web Service Provider every time it needs to compute its trust in that specific Web Service Provider. In case they had, then $WSC_1$ requests them their recommendation about the Web Service Provider. In doing so, $WSC_1$ can weight each user's recommendation individually.

Figure 3B:
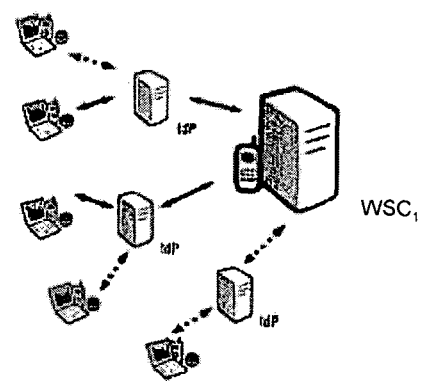

FIG. 3b shows a second approach that consists of $WSC_1$ asking only to those users who have actually had a transaction with the Web Service Provider. $WSC_1$ can weight each user's recommendation individually, but using less messages than the approach of FIG. 3a.

Figure 3C:
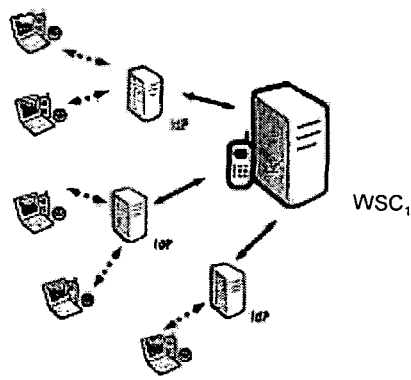

FIG. 3c shows a third approach of gathering recommendations from the users about the Web Service Provider, wherein only Identity Providers are asked that $WSC_1$ knows. Each Identity Provider IdP will give back an aggregated recommendation of all of its users who have had a transaction with Web Service Provider in the past. Thus, $WSC_1$ does not need to know who has had an interaction with the Web Service Provider. This is the approach that uses less of messages than the approaches of FIG. 3a or FIG. 3b. However, the opinions of the users can not be weighted individually.

The same three approaches of FIG. 3 can be applied for the information retrieval of the opinions of other Web Service Consumers about the Web Service Provider.

Figure 4:
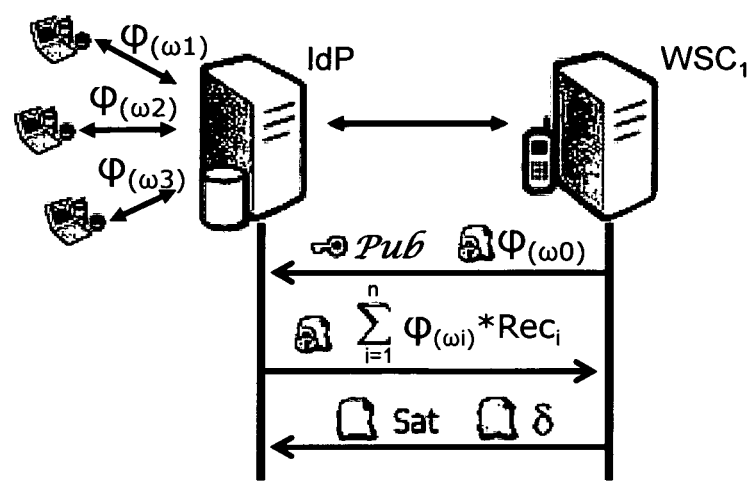
FIG. 4 shows another approach of gathering information in order to provide a trust assessment of the Web Service Provider according to the present invention.

FIG. 4 shows a forth approach, based on the three approaches illustrated in FIG. 3. In this embodiment, every Identity Provider IdP stores the weight given by the requested Web Service Consumer $WSC_1$ to each of its users, but encrypted with $WSC_1$'s public key, so the Identity Provider IdP cannot discover the actual weight.

According to FIG. 4, in the very first step, $WSC_1$ sends its public key to the IdP, together with the default initial weight for all its users. Then the IdP computes the weighted aggregation of all its users' recommendations and gives it back to $WSC_1$, encrypted with $WSC_1$'s public key. $WSC_1$ then decrypts that aggregation with its private key to obtain the weighted recommendation of all the users belonging to that IdP. In order to accomplish this, a private homomorphism is provided fulfilling that $$\sum_{i=0}^{n} \varphi(\omega_{u_i}) \cdot Rec_{u_i} = \varphi\left(\sum_{i=1}^{n} \omega_{u_i} \cdot Rec_{u_i}\right).$$

Thus, $WSC_1$ can weight each user's recommendation individually, using few messages and the actual recommendation value of each user is only known by its corresponding IdP.

According to FIG. 4, the requested Web Service Consumer $WSC_1$ sends to IdP the satisfaction of the user who asked for the service, together with a certain threshold $\delta \in [0,1]$, both without being ciphered, and that is used to determine whether to punish or reward the users or the other Web Service Consumers.

Figure 5:
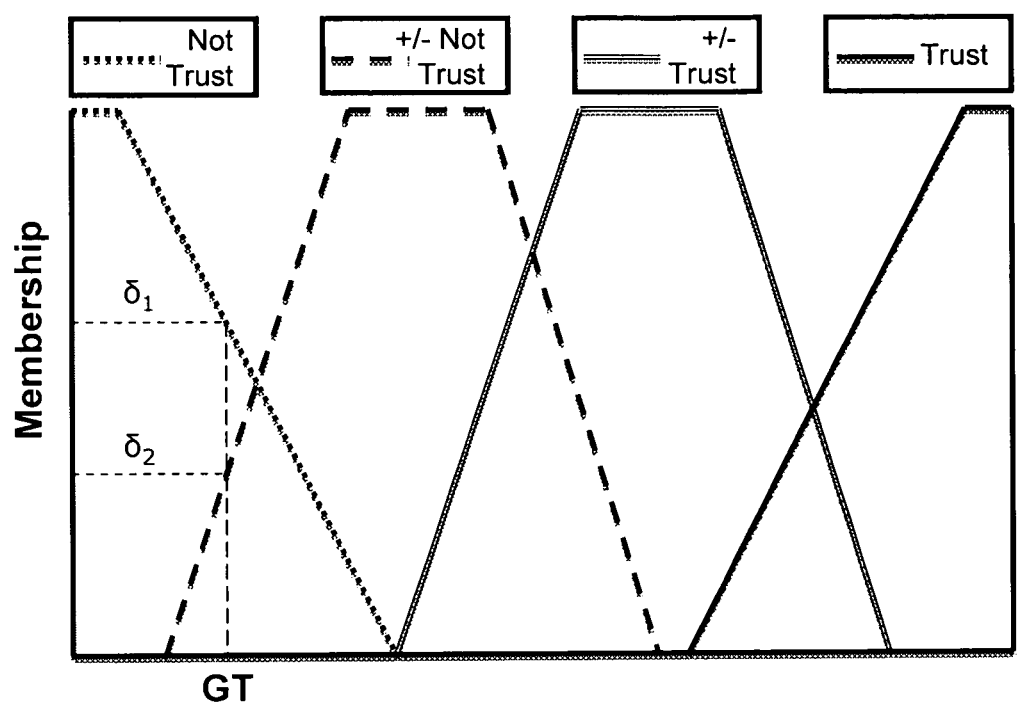
FIG. 5 shows the employment of fuzzy sets in order to model trust levels according to a preferred embodiment of the present invention.

FIG. 5 shows the employment of fuzzy sets in order to model trust levels according to a preferred embodiment of the present invention. After computing the global trust value of Web Service Provider, the requested Web Service Consumer $WSC_i$ has to decide whether to carry out the whole transaction with the Web Service Provider, to carry it out partially or even not to have any interaction with the Web Service Provider.

This decision depends on which trust level the Web Service Provider is placed. Every Web Service Consumer can define its own trust levels.

Each trust level has associated an amount and/or type of information that can be exchanged if the communicating party is placed in that level. For instance, in the example shown in FIG. 5 there are four trust levels. If a Web Service Provider is placed in the level "Trust", then the whole transaction is performed. If the trust level is "+/− Trust" then only some non-critical information are exchanged. Very few non-critical or relevant information are exchanged if the Web Service Provider is placed in level "+/− Not Trust". If the level is "Not Trust", then no transaction is carried out.

In order to find out the trust level of a Web Service Provider from its global trust value GT there is a need to know the values returned by the membership functions of every fuzzy set containing GT as an element. In the example shown in FIG. 5 the membership function of fuzzy set "Not Trust" returns the value $\epsilon_1$ for GT, while the membership function of fuzzy set "+/− Not Trust" returns $\epsilon_2$, for the same crisp value. Once having all those values, the probability of the Web Service Provider of being placed in one trust level or another is computed as follows:

$$P(\text{"Not Trust"}) = \frac{\epsilon_1}{\epsilon_1 + \epsilon_2}$$

$$P(\text{"+/− Not Trust"}) = \frac{\epsilon_2}{\epsilon_1 + \epsilon_2}$$

In a generic way, the probability of the Web Service Provider of being placed in trust level $TL_j$ being $\epsilon_i$, $i=1\ldots,n$ the values returned by every membership function (and n the number of trust levels), could be obtained through the next formula:

$$P(TL_j) = \frac{\epsilon_j}{\sum_{i=1}^{n} \epsilon_i}$$

If $\epsilon_j = 0, \forall j$, the fuzzy set $TL_k$ with $\epsilon_k \neq 0$ for the closest value $v < GT$ is selected.

Figure 6:
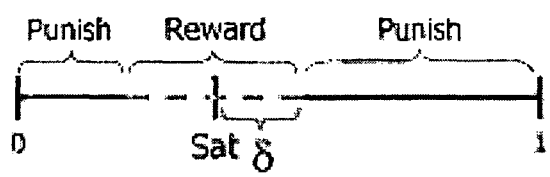
FIG. 6 shows a mechanism to measure the divergence between the satisfaction of the user and the previously given recommendation of every user.

FIG. 6 shows a mechanism to measure the divergence between the final satisfaction Sat of the user and the previously given recommendation $Rec_i$ of every user, wherein the value of $|Sat - Rec_i|$ is calculated. Therefore, as it can be observed in FIG. 6, if $|Sat - Rec_i| < \delta$ then a reward is performed over user $u_i$. Otherwise, if $|Sat - Rec_i| \geq \delta$, then user $u_i$ is punished.

Both punishment and reward are proportional to the distance between the recommendation given by the user and the satisfaction perceived by the customer. That is, the closer those values are, the greater is the reward, and the farther those values are, the greater is the punishment.

Since $|Sat - Rec_i|, \omega_i \in [0,1]$, the private homomorphism $\phi$ is needed to carry out the following operations: If $|Sat - Rec_i| < \delta$, i.e., if a reward is to be performed on user $u_i$, increasing its weight $\omega_i$, $$\phi(\omega_i)^{|Sat - Rec_i|} = \phi(\omega^{|Sat - Rec_i|})$$

and if $|Sat - Rec_i| \geq \delta$, i.e., if user $u_i$ must be punished, decreasing its weight $\omega_i$, $$\varphi(\omega_i)\frac{1}{|Sat - Rec_i|} = \varphi(\omega_i^{|Sat - Rec_i|}).$$

Once all the users' weights stored in an IdP have been appropriately modified, the weights have to be normalized in order to preserve the condition shown in equation (4) according to $$\varphi(\omega_i) = \frac{\varphi(\omega_i)}{\sum_{j=1}^{n} \varphi(\omega_j)} = \varphi\left(\frac{\omega_i}{\sum_{j=1}^{n} \omega_j}\right).$$

It is important to notice that a value $\delta \to 1$ means a low reward and low punishment, while $\delta \to 0$ means high reward and high punishment. It is also important to note the relevance of $\delta$ parameter since it controls the punish and reward mechanism. A low value of $\delta$ implies that too few users will be rewarded and too many punished, but those of them who are rewarded, will be highly rewarded. On the other hand, a high value of $\delta$ means that too many users will be rewarded and the few ones who will be punished, will be slightly punished.

Thus, the following implications can be concluded:

$\delta \to 0 \Rightarrow \rho \to -1 \Rightarrow \omega \to 0$ $\delta \to 1 \Rightarrow \rho \to 1 \Rightarrow \omega \to 1$ That is, the lower $\delta$ is, the more strict and severe is the punishment. And the greater $\delta$ is the higher is the reward scheme. Thus, a good initial value is $\delta = 0.5$. However, it can also be updated dynamically along the time in order to avoid oscillating the behaviours of the Web Service Provider, and each Web Service Consumer would be responsible for managing its own $\delta$ parameter value individually.

Figure 7:
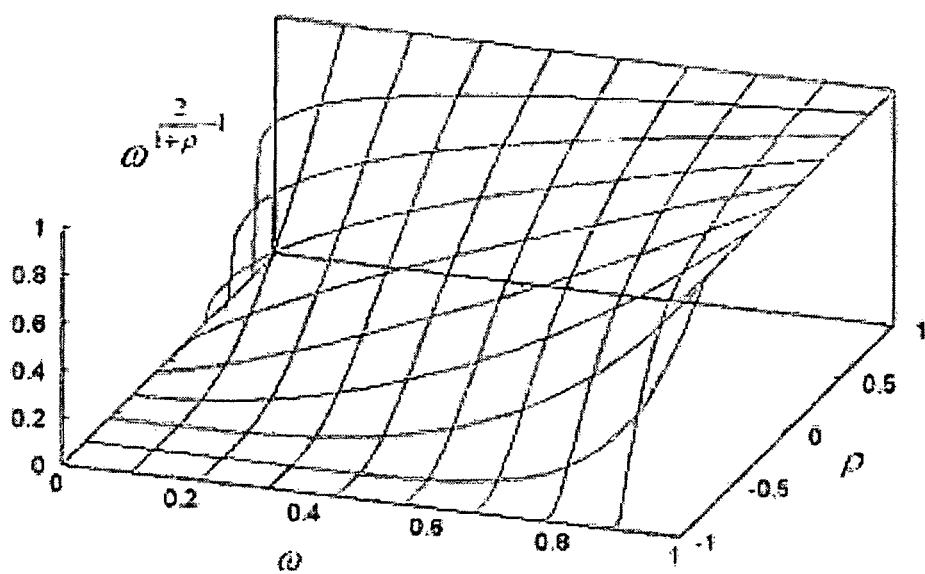
FIG. 7 illustrates the weights' updating of the information sources according to an embodiment of the present invention.

FIG. 7 illustrates the weights' updating of the information sources according to an embodiment of the present invention. Regarding the initial value of the weights given to each source of information, it is considered that a good set of values could be the following:

$\omega_D = 0.5$ $\omega_U = \omega_{WSC} = 0.25$

Moreover, the evolution of these weights along the time depend on the accuracy and reliability of each source. Thus, if users (equally Web Service Consumers) are always being punished, the influence of their opinions in the assessment of the trust assessment in the form of the global trust GT should be decreased. On the other hand, if the entities of an information source are always being rewarded, a greater weight should be given to that precise source when computing the global trust value.

So let $\rho_U$ be the average between the amount of rewards and punishments received by all the queried users, computed as follows:

$$\rho_U = \frac{\sum_{i=1}^{n}((1 - |Sat - Rec_i|_{<\delta}) - |Sat - Rec_i|_{\geq\delta})}{n} \quad (9)$$

$\rho_{WSC}$ would be obtained in a similar way. It is important to notice that both $\rho_U, \rho_{WSC} \in [-1,1]$. A value $\rho_U = -1$ means that absolutely all the users have received the maximum punishment (i.e. |Sat−Rec$_i$|=1≥δ, ∀i), so their weight should be decreased to 0.

Alternatively, if $\rho_U=1$ implies that all the users have received the maximum reward possible (that is, |Sat−Rec$_i$|=0≤δ, ∀i), so their weight should take the maximum value.

Finally, if $\rho_U=0$, on average term half the users have given a bad recommendation (and therefore have been punished) and the other half have received a good reward due to their accurate recommendations. In this case, the weight $\omega_U$ given to users in formula (3) should remain invariable.

In order to achieve these conditions, both weights $\omega_U$ and $\omega_{WSC}$ might be redefined after the last step of punishing and rewarding has been completed, according to the following formulae, as it can be observed in FIG. 7.

$$\omega_U \leftarrow \omega_U^{\frac{2}{1+\rho_U}-1} \quad \omega_{WSC} \leftarrow \omega_{WSC}^{\frac{2}{1+\rho_{WSC}}-1} \quad (10)$$

Finally, in order to preserve the relation shown in equation (4), weights need to be normalized, that is $$\omega_D = \frac{\omega_D}{\omega_D + \omega_U + \omega_{WPC}}$$

$$\omega_U = \frac{\omega_U}{\omega_D + \omega_U + \omega_{WPC}}$$

$$\omega_{WPC} = \frac{\omega_{WPC}}{\omega_D + \omega_U + \omega_{WPC}}$$

Another normalization is also needed when a new user joins or registers to the Identity Provider. In that case, the new user is initially given the default weight $\phi(\omega_0)$, but since this incorporation breaks the condition shown in equation (4), the following operation has to be performed, again:

$$\varphi(\omega_i) = \frac{\varphi(\omega_i)}{\sum_j^{n+1} \varphi(\omega_j)} = \varphi\left(\frac{\omega_i}{\sum_{j=1}^{n+1} \omega_j}\right)$$

Figure 8:
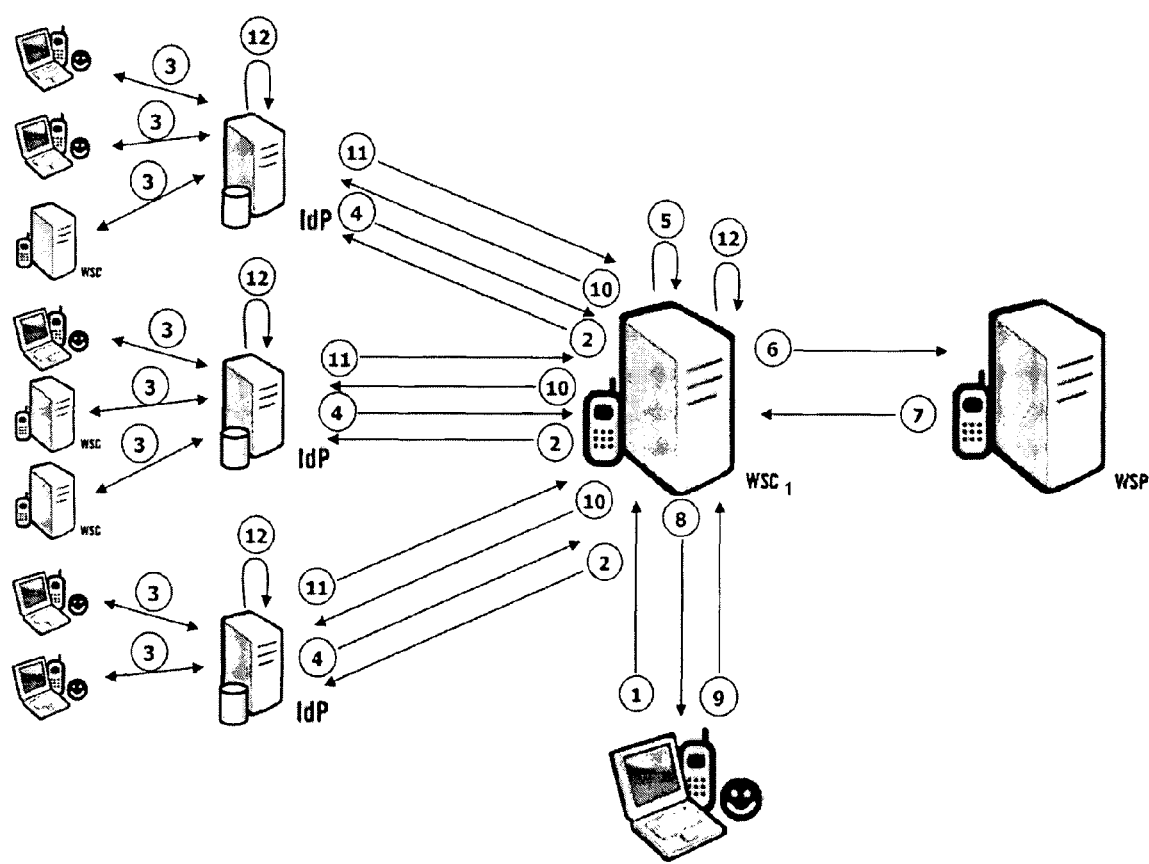
FIG. 8 shows a further application scenario according to a method and a network according to the present invention and illustrates the steps carried out in detail.

FIG. 8 shows a further application scenario according to a method and a network according to the present invention and illustrates the steps that are carried out in detail.

The steps illustrated in FIG. 8 are:
1. One user asks for a service to a certain Web Service Consumer $WSC_1$.
2. $WSC_1$ requests all its known Identity Providers IdP regarding their aggregated recommendations about the selected Web Service Provider WSP, given by the users and Web Service Consumers (WSCs) registered on them.
3. Each IdP checks the recommendations of their users and WSCs about the queried WSP and performs the aggregated recommendation according to formulae (1) and (2).
4. Every IdP returns the aggregated recommendation to the requested $WSC_1$.
5. $WSC_1$ assesses its trust assessment in the form of the global trust value about WSP using the formula (3) and fits it in one of its trust levels.
6. $WSC_1$ then actually requests the service to the WSP, providing more or less parameters, depending on which trust level the WSP was placed in the previous step.
7. WSP provides the requested service, or a worse one, or even a better one, depending on its goodness.
8. $WSC_1$ delivers the service to the user.
9. The user gives a feedback to the $WSC_1$ containing his/her satisfaction with the actually received service.
10. $WSC_1$ sends the satisfaction of the user, together with the threshold δ, to every known IdP.
11. Each IdP calculates $\rho_U$ and $\rho_{WSC}$ according to formula (9) and sends it back to the $WSC_1$.
12. Every IdP and the $WSC_1$ perform the corresponding punishment or reward, according to the formulae (5), (6), (7) and (8) for the IdP, and formula (10) for the $WSC_1$.

Figure 9:
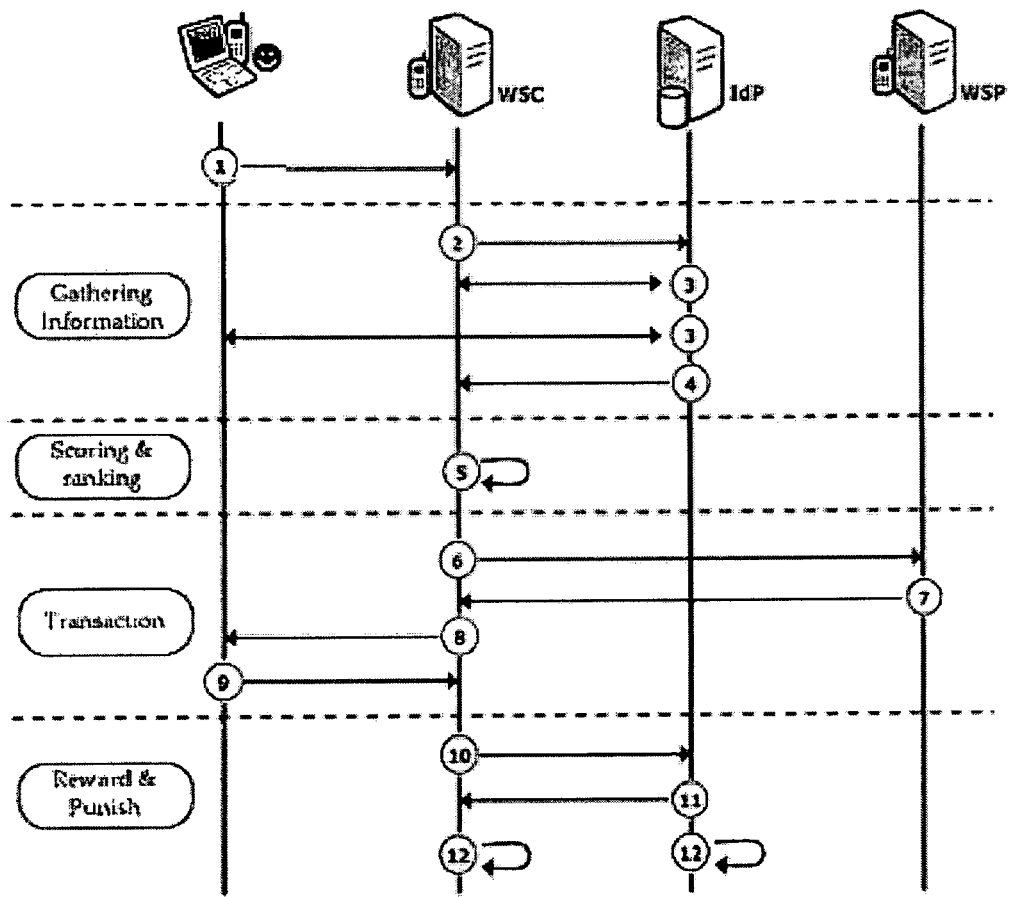
FIG. 9 is a sequence diagram illustrating the steps of FIG. 8, wherein the steps are fitted in the generic steps of FIG. 2.

FIG. 9 is a sequence diagram illustrating the steps of FIG. 8, wherein the steps are fitted in the generic steps of FIG. 2.

Many modifications and other embodiments of the invention set forth herein will come to mind the one skilled in the art to which the invention pertains having the benefit of the teachings presented in the foregoing description and the associated drawings. Therefore, it is to be understood that the invention is not to be limited to the specific embodiments disclosed and that modifications and other embodiments are intended to be included within the scope of the appended claims. Although specific terms are employed herein, they are used in a generic and descriptive sense only and not for purposes of limitation.

The invention claimed is:

1. A method for supporting a reputation mechanism in a network, the network including one or more domains with one or more users being connected to said domains, one or more Identity Providers that manage identity information on behalf of said users, and at least one entity that functions as a Web Service Consumer for said users, the method comprising:
   requesting, by the Web Service Consumer, known Identity Providers of the Web Service Consumer regarding a recommendation of said Web Service Provider when a user requests the Web Service Consumer of one of the domains for a web service provided by a Web Service Provider of another of the domains;
   collecting, by the Identity Providers functioning as recommendation aggregators, reputation assessments of said Web Service Provider from entities registered on said Identity Providers, the entities being one or more of users and Web Service Consumers; and
   calculating at one or more processing devices at the Identity Providers an aggregated recommendation and returning the aggregated recommendation to said requested Web Service Consumer that, on the basis of said aggregated recommendation, determines a trust assessment about said Web Service Provider,
   wherein a privacy homomorphism is employed for providing an encrypted exchange of recommendation related information between said Identity Providers and said requested Web Service Consumer, and
   the aggregated recommendation is aggregated from encrypted recommendation related information without decrypting the recommendation related information prior to aggregation of the aggregated recommendation.

2. The method according to claim 1, wherein said aggregated recommendation returned by said Identity Providers to said requested Web Service Consumer in each case is a single aggregated value for recommendations of said users registered on said Identity Providers and/or a single aggregated value for recommendations of said Web Service Consumers registered on said Identity Providers.

3. The method according to claim 1, wherein the ElGamal Encryption Scheme is applied as said privacy homomorphism.

4. The method according to claim 1, further comprising sending, by the requested Web Service Consumer, a public key to said Identity Providers, together with a default initial weight for said entities registered on said Identity Providers, said initial weight being encrypted with said public key of said requested Web Service Consumer.

5. The method according to claim 1, wherein said Identity Providers (IdPs) store a weight given by said requested Web Service Consumer to each of said entities registered on said Identity Providers, said weight being encrypted with a public key of said requested Web Service Consumer.

6. The method according to claim 1, wherein said requested Web Service Consumer decrypts said aggregated recommendation returned by said Identity Providers with its private key to obtain a weighted recommendation of said entities registered on said Identity Providers.

7. A method for supporting a reputation mechanism in a network, the network including one or more domains with one or more users being connected to said domains, one or more Identity Providers that manage identity information on behalf of said users, and at least one entity that functions as a Web Service Consumer for said users, the method comprising:
requesting, by the Web Service Consumer, known Identity Providers of the Web Service Consumer regarding a recommendation of said Web Service Provider when a user requests the Web Service Consumer of one of the domains for a web service provided by a Web Service Provider of another of the domains;
collecting, by the Identity Providers functioning as recommendation aggregators, reputation assessments of said Web Service Provider from entities registered on said Identity Providers, the entities being one or more of users and Web Service Consumers; and
calculating at one or more processing devices at the Identity Providers an aggregated recommendation and returning the aggregated recommendation to said requested Web Service Consumer that, on the basis of said aggregated recommendation, determines a trust assessment about said Web Service Provider,
wherein a privacy homomorphism is employed for providing an encrypted exchange of recommendation related information between said Identity Providers and said requested Web Service Consumer, and
wherein each of said Identity Providers performs said aggregated recommendation of users being registered on said Identity Providers according to $$\sum_{i=0}^{n} \varphi(\omega_{u_i}) \cdot Rec_{u_i} = \varphi\left(\sum_{i=1}^{n} \omega_{u_i} \cdot Rec_{u_i}\right),$$

wherein $Rec_{u_i}$ is a recommendation provided by a user $u_i$ being one of n users that are registered on the corresponding Identity Provider, wherein $\omega_{u_i}$ is the weight assigned to said recommendation of said user $u_i$ and wherein $\varphi$ is a privacy homomorphism that provides addition and scalar multiplication.

8. A method for supporting a reputation mechanism in a network, the network including one or more domains with one or more users being connected to said domains, one or more Identity Providers that manage identity information on behalf of said users, and at least one entity that functions as a Web Service Consumer for said users, the method comprising:
requesting, by the Web Service Consumer, known Identity Providers of the Web Service Consumer regarding a recommendation of said Web Service Provider when a user requests the Web Service Consumer of one of the domains for a web service provided by a Web Service Provider of another of the domains;
collecting, by the Identity Providers functioning as recommendation aggregators, reputation assessments of said Web Service Provider from entities registered on said Identity Providers, the entities being one or more of users and Web Service Consumers; and
calculating at one or more processing devices at the Identity Providers an aggregated recommendation and returning the aggregated recommendation to said requested Web Service Consumer that, on the basis of said aggregated recommendation, determines a trust assessment about said Web Service Provider,
wherein a privacy homomorphism is employed for providing an encrypted exchange of recommendation related information between said Identity Providers and said requested Web Service Consumer, and
wherein each of said Identity Providers performs said aggregated recommendation of the Web Service Consumers registered on said Identity Providers according to $$\sum_{i=0}^{m} \varphi(\omega_{WSC_i}) \cdot Rec_{WSC_i} = \varphi\left(\sum_{i=1}^{m} \omega_{WSC_i} \cdot Rec_{WSC_i}\right),$$

wherein $Rec_{WSC_i}$ is a recommendation provided by a Web Service Consumer $WSC_i$ being one of m Web Service Consumers that are registered on the corresponding Identity Provider, wherein $\omega_{WSC_i}$ is the weight assigned to said recommendation of said Web Service Consumer $WSC_i$, and wherein $\varphi$ is a privacy homomorphism that provides addition and scalar multiplication.

9. The method according to claim 1, wherein said trust assessment is determined according to $$GT=(\omega_D \cdot T_D)+(\omega_U \cdot T_U)+(\omega_{WSC} \cdot T_{WSC}),$$

wherein GT is said trust assessment assigned to said Web Service Provider, wherein $T_D$ is a direct trust placed on said Web Service Provider, wherein $T_U$ is the aggregated trust received from other users, wherein $T_{WSC}$ is the aggregated trust received from other Web Service Consumers, and wherein $\omega_D$, $\omega_U$ and $\omega_{WSC}$ are the corresponding weights.

10. The method according to claim 1, wherein said requested Web Service Consumer defines trust levels, and said requested Web Service Consumer fits said trust assessment in one of said trust levels.

11. The method according to claim 10, wherein fuzzy sets are employed in order to represent said trust levels.

12. The method according to claim 1, wherein said requested Web Service Consumer requests said web service to said Web Service Provider, and said requested Web Service Provider provides more or fewer parameters depending on which trust level said Web Service Provider is placed.

13. The method according to claim 1, wherein rewards or punishments are performed on said users and/or on said Web Service Consumers registered on said Identity Providers according to accuracy and reliability of recommendations of the Identity Providers.

14. The method according to claim 1, wherein said requesting user gives a feedback to said requested Web Service Consumer, said feedback including a satisfaction of said requesting user with said provided web service.

15. The method according to claim 1, wherein said requested Web Service Consumer sends said satisfaction together with a threshold $\delta$ to said Identity Providers, said threshold $\delta$ being employed to determine whether to punish or reward said users and/or Web Service Providers registered on said Identity Providers.

16. The method according to claim 15, wherein the divergence between the satisfaction Sat of said requesting user and a previously given recommendation $Rec_{u_i}$ of a user $u_i$ is measured by calculating the value of $|Sat-Rec_{u_i}|$, wherein a reward is performed on the user $u_i$ in case of $|Sat-Rec_{u_i}|<\delta$, and wherein a punishment is performed on the user $u_i$ in case of $|Sat-Rec_{u_i}|\geq\delta$.

17. A method for supporting a reputation mechanism in a network, the network including one or more domains with one or more users being connected to said domains, one or more Identity Providers that manage identity information on behalf of said users, and at least one entity that functions as a Web Service Consumer for said users, the method comprising:

requesting, by the Web Service Consumer, known Identity Providers of the Web Service Consumer regarding a recommendation of said Web Service Provider when a user requests the Web Service Consumer of one of the domains for a web service provided by a Web Service Provider of another of the domains;

collecting, by the Identity Providers functioning as recommendation aggregators, reputation assessments of said Web Service Provider from entities registered on said Identity Providers, the entities being one or more of users and Web Service Consumers; and calculating at one or more processing devices at the Identity Providers an aggregated recommendation and returning the aggregated recommendation to said requested Web Service Consumer that, on the basis of said aggregated recommendation, determines a trust assessment about said Web Service Provider, wherein a privacy homomorphism is employed for providing an encrypted exchange of recommendation related information between said Identity Providers and said requested Web Service Consumer, and wherein in case a reward is to be performed on a user $u_i$, a weight of the user $u_i$ is increased according to $$\phi(\omega_{u_i})^{|Sat-Rec_{u_i}|}=\phi(\omega_{u_i}^{|Sat-Rec_{u_i}|}), \text{ and}$$

wherein in case a punishment is to be performed on the user $u_i$, the weight $\omega_{u_i}$ of the user $u_i$ is decreased according to $$\varphi(\omega_{u_i})^{\frac{1}{|Sat-Rec_{u_i}|}} = \varphi\left(\omega_{u_i}^{\frac{1}{|Sat-Rec_{u_i}|}}\right).$$

18. A method for supporting a reputation mechanism in a network, the network including one or more domains with one or more users being connected to said domains, one or more Identity Providers that manage identity information on behalf of said users, and at least one entity that functions as a Web Service Consumer for said users, the method comprising:

requesting, by the Web Service Consumer, known Identity Providers of the Web Service Consumer regarding a recommendation of said Web Service Provider when a user requests the Web Service Consumer of one of the domains for a web service provided by a Web Service Provider of another of the domains;

collecting, by the Identity Providers functioning as recommendation aggregators, reputation assessments of said Web Service Provider from entities registered on said Identity Providers, the entities being one or more of users and Web Service Consumers; and calculating at one or more processing devices at the Identity Providers an aggregated recommendation and returning the aggregated recommendation to said requested Web Service Consumer that, on the basis of said aggregated recommendation, determines a trust assessment about said Web Service Provider, wherein a privacy homomorphism is employed for providing an encrypted exchange of recommendation related information between said Identity Providers and said requested Web Service Consumer, and wherein in case a reward is to be performed on Web Service Consumer $WSC_i$, a weight $\omega_{WSC_i}$ of a user $WSC_i$ is increased according to $$\phi(\omega_{WSC_i})^{|Sat-Rec_{WSC_i}|}=\phi(\omega_{WSC_i}^{|Sat-Rec_{WSC_i}|}), \text{ and}$$

wherein in case a punishment is to be performed on a user the weight of the user $u_i$ is decreased according to $$\varphi(\omega_{WSC_i})^{\frac{1}{|Sat-Rec_{WSC_i}|}} = \varphi\left(\omega_{WSC_i}^{\frac{1}{|Sat-Rec_{WSC_i}|}}\right).$$

19. The method according to claim 1, wherein each of said Identity Providers calculates an average deviation of said satisfaction of said requesting user with said recommendations of said users and/or Web Service Consumers registered on said Identity Providers, said Identity Providers sending said average deviation to said requested Web Service Consumer.

20. The method according to claim 19, wherein said requested Web Service Consumer performs a corresponding reward or punishment on a weight $\omega_U$ of a user and a weight $\omega_{WSC}$ of a Web Service Consumer on the basis of said average deviation received from said Identity Providers.

21. A network including a reputation mechanism, the network comprising:
one or more processing devices;
one or more domains with one or more users connected to said domains;
one or more Identity Providers that manage identity information on behalf of said users; and
at least one entity that functions as the Web Service Consumer for said users,
wherein when the user requests the Web Service Consumer of one of said domains for the web service provided by the Web Service Provider of another of said domains, said requested Web Service Consumer requests its known Identity Providers regarding the recommendation of said Web Service Provider,
said Identity Providers function as recommendation aggregators by collecting the reputation assessments of said Web Service Provider from the entities registered on said Identity Providers, the entities being the users and/or the Web Service Consumers, said Identity Providers return the aggregated recommendation to said requested Web Service Consumer that, on the basis of said aggregated recommendation, determines the trust assessment about said Web Service Provider, the privacy homomorphism is employed for providing the encrypted exchange of recommendation related information between said Identity Providers and said requested Web Service Consumer, the aggregated recommendation is aggregated from encrypted recommendation related information without decrypting the recommendation related information prior to aggregation of the aggregated recommendation, and one or more of the Identity Providers and the entity that functions as the Web Service Consumer comprise the one or more processing devices.

* * * * *